United States Patent

Wiley et al.

[15] 3,640,872
[45] Feb. 8, 1972

[54] AUTOMATIC TRANSMISSION FLUID

[72] Inventors: Morris A. Wiley, Fishkill; Roger G. Lacoste, Hopewell Junction; Clemence J. Henry, Newburgh; James O. Waldbillig, Beacon, all of N.Y.

[73] Assignee: Texaco Inc., New York, N.Y.

[22] Filed: Oct. 25, 1968

[21] Appl. No.: 770,803

[52] U.S. Cl. ............................................. 252/75, 252/32.7
[51] Int. Cl. ........................................................ C09k 3/00
[58] Field of Search ..................... 252/75, 76, 77, 32.7, 49.8, 252/49.9; 260/934

[56] References Cited

UNITED STATES PATENTS 3,450,636   6/1969   Rausch .................................... 252/75

OTHER PUBLICATIONS

"Petroleum Refiner"—Process Handbook Ed. 9/1948, Sec. 2 Published by Gulf Publishing Co., Houston, Tex. pp. 186–198, 210, 230 & 238

*Primary Examiner*—Leon D. Rosdol
*Assistant Examiner*—D. Silverstein
*Attorney*—K. E. Kavanagh and Thomas H. Whaley

[57] ABSTRACT

Automatic transmission fluid comprising a mineral lubricating oil, a zinc di-(alkylphenoxyalkoxyalkyl) dithiophosphate, a nitrogen-containing methacrylate polymer, a polyethylene polyamine-alkenyl succinic anhydride reaction product, an aryl-substituted naphthylamine and an N-acyl sarcosine, and a method of operating an automatic transmission.

7 Claims, No Drawings

AUTOMATIC TRANSMISSION FLUID

An automatic transmission is a complex hydraulic mechanism which incorporates the functions of a torque converter, wet clutches and planetary gearing in a relatively compact sealed unit. This device requires a transmission fluid which provides lubricity, extreme pressure properties and carefully selected frictional properties. The fluid must not be corrosive to copper alloys or in any way deleterious to the synthetic seals in the transmission. A very critical requirement for the fluid is that it possess outstanding oxidation resistance and stability in order to withstand prolonged high-shear, high-temperature conditions without decomposition.

The essential requirements of an automatic transmission fluid are met by a critically balanced combination of additives which cooperate to provide dispersant, extreme pressure, corrosion inhibiting, antioxidant, viscosity and friction-modifying properties to the fully formulated hydraulic fluid. A key component of an automatic transmission fluid in commercial use is a zinc salt of a dialkyldithiophosphate which imparts oxidation and corrosion inhibiting properties to this transmission fluid. More specifically, the zinc salt of the reaction product of a mixture of lower aliphatic alcohols, methyl-isobutyl-carbinol and isopropanol, and $P_2S_5$ followed by neutralization with a basic zinc compound, when employed in a properly balanced automatic transmission fluid blend, has heretofore been effective in providing a fluid with acceptable oxidation and corrosion inhibiting properties.

An important test for determining the service life and usefulness of a transmission fluid is the Powerglide AT-13 Cycling Test, a Chevrolet Dexron Specification Test for automatic transmission fluids. This is a high energy cycling test which measures the friction-stable life of the transmission fluid and it must be passed before a fluid will be qualified for service. As presently specified, an automatic transmission fluid must provide a minimum life of 250 hours in the AT-13 Powerglide Cycling Test in order to qualify.

Improvements in automatic transmissions and setting of higher performance standards have put increasingly severe demands on the transmission fluid. A fluid containing the above-noted reaction product which once qualified for automatic transmission service has now been found to be seriously deficient in friction-stable life as measured in the Powerglide AT-13 Cycling Test. This fluid no longer qualifies for its intended purpose and the deficiency has been traced to the zinc dialkyl dithiophosphate reaction product identified above.

A novel hydraulic fluid formulation has now been discovered which overcomes the deficiencies of the former commercial fluid and provides an improved fluid with surprisingly long friction-stable life.

In accordance with this invention, a hydraulic transmission fluid is provided comprising a major proportion of a mineral lubricating oil and a zinc di(alkylphenoxypolyalkoxyalkyl) dithiophosphate which when employed in a critically formulated automatic transmission fluid unexpectedly multiplies the friction-stable life of the fluid to produce a highly effective and qualified automatic transmission fluid. The hydraulic fluid of the invention comprises at least 86 weight percent of a mineral lubricating oil, 0.1 to 5.0 weight percent of a zinc di(alkylphenoxypolyalkoxyalkyl) dithiophosphate, 0.5 to 10 weight percent of a viscosity index improver comprising a concentrate of a nitrogen-containing polymer of mixed alkyl and aminoalkyl esters of methacrylic acid having a molecular weight ranging from 25,000 to 1,250,000, 0.5 to 5.0 weight percent of a detergent-dispersant comprising the reaction product of polyethylene polyamine and an alkenyl succinic anhydride 0.1 naphthylamine to 2.5 percent of an N-aryl substituted napbthylamine and from about 0.05 to 1 percent of an n-acyl sarcosine. This invention also relates to a method of operating an automatic transmission.

The antirust and corrosion inhibiting properties of the transmission fluid are normally supplemented by a combination of conventional lubricating oil additives. In one combination, the transmission fluid contains from 1 to 5 percent of an overbased calcium sulfonate and 0.05 to 2.0 percent of overbased barium sulfonate. In an alternate combination, the transmission fluid contains from 0.02 to 0.25 percent of an antirust concentrate consisting of about 91 percent of a hydrolyzed alkenyl succinic anhydride, 7.5 percent of a mixture of mono- and di-$C_{12}$ alkyl phosphoric acid esters and 1.5 percent phenol. The hydraulic transmission fluid of the invention is characterized by an SUS viscosity at 210° F. of 49 to 60, a viscosity index of at least 145 and pour point at least as low as −45° F. This transmission fluid fully meets the Dexron specifications set by General Motors for automatic transmission fluids.

The mineral lubricating oil which constitutes at least 86 weight percent of the composition is a refined oil or a mixture of refined oils selected according to the viscosity requirements of the particular service. For automatic transmissions, where the requirements include an SUS viscosity of the compounded oil at 210° F. of 49 minimum up to 60, and at 0° F. of 7,000 maximum; the base oil or the major component thereof is generally a distillate oil lower than the SAE 10 Grade motor oil, such as one having an SUS viscosity at 100° F. of less than 150, and generally between 50 and 125. The distillate fraction can be a refined paraffinic distillate or a refined naphthenic distillate or a mixture thereof. The flash point of the distillate component of the base oil will generally be above 300° F., if the distillate fraction constitutes the entire base oil, its flash point will usually be above 375° F.

A preferred base oil comprises approximately 70 to 95 percent of a refined distillate oil and 5 to 30 percent of a refined residual fraction which imparts desired high flash point and lubricity to the base oil. A preferred residual fraction comprises a paraffin base residuum which has been propane deasphalted and subjected to centrifuge dewaxing and which has an SUS at 210° F. below about 250. A particularly effective base oil mixture comprises 65 percent of a furfural refined, acid-treated, clay-contacted solvent dewaxed, paraffin base distillate having an SUS at 100° F. of 100; a viscosity index about 100, a flash above 380° F. and a pour below about +10° F., 22 percent of an acid-treated naphthenic base distillate having an SUS at 100° F. of 60, a flash above 300° F. and a pour below −40° F., and 13 percent of a paraffin base residuum which has been propane deasphalted, centrifuge dewaxed, and clay contacted and which has an SUS viscosity at 210° F. of about 160, a flash above 530° F. and a pour of +5° F.

The zinc di(alkylphenoxypolyalkoxyalkyl) dithiophosphate which has been found to be a critical component of the automatic transmission fluid having a long friction-stable life corresponds to the following formula:

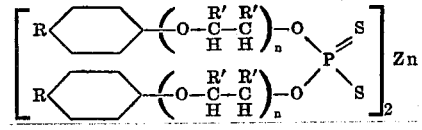

in which R represents an aliphatic radical having from six to 15 carbon atoms R' is hydrogen or an alkyl radical having from one to four carbon atoms and n is an integer from 1 to 10. Particularly effective compounds in this class are the zinc di(nonylphenoxyethyl) dithiophosphate, zinc di(dodecylphenoxyethyl) dithiophosphate and zinc di-(nonylphenoxyethoxyethyl) dithiophosphate. Zinc di-(nonylphenoxyethyl) dithiophosphate is prepared by reacting a nonylphenol-ethylene oxide compound with phosphorus pentasulfide followed by neutralization of the acid formed with a basic zinc compound, such as zinc carbonate, zinc oxide or zinc hydroxide. The general preparation of the compounds in this class is disclosed in U.S. Pat. No. 2,344,395 and 3,293,181. In use, it is convenient to prepare a mineral oil solution of the zinc di($C_{6-15}$ alkylphenoxypolyalkoxyalkyl)

dithiophosphate containing from 50 to 75 weight percent of the zinc salt. The salts were found to be unexpectedly effective as oxidation and corrosion inhibitors for automatic transmission fluids when employed in a concentration ranging from about 0.1 to 5.0 weight percent based on the hydraulic fluid.

The viscosity index improvement of the transmission fluid of the invention is effected with a nitrogen-containing methacrylate ester polymer having the formula:

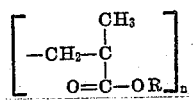

wherein R is an alkyl group, a dialkyl aminoalkyl group or a mixture of such groups containing from one to 20 carbon atoms and $n$ is a member providing a molecular weight of the polymer in the range from 25,000 to 1,250,000 and preferably from 35,000 to 200,000. Various methacrylate ester polymers of this type are known which possess pour depressant and viscosity index improving properties. A very effective material of this type is a copolymer of the lower $C_4$-$C_{14}$ alkyl methacrylate esters. A commercial methacrylate copolymer of this type which is primarily a viscosity index improver corresponds to the formula in which R represents about 32 percent lauryl, 28 percent butyl, 26 percent stearyl and 14 percent hexyl groups and having a molecular weight above 50,000. The methacrylate ester copolymer is employed in the base oil in a proportion ranging from about 0.5 to 10 percent by weight preferably from 1.0 to 5.0 weight percent based upon the hydraulic oil composition in order to impart the desired viscosity, viscosity index and pour point. It is understood that other methacrylate ester polymers of the foregoing type can be employed.

A dispersant is essential in the automatic transmission fluid. An effective dispersant comprises a composition resulting from mixing a substituted succinic compound, selected from the class consisting of substituted succinic acids having the formula:

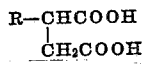

and substituted succinic anhydrides having the formula:

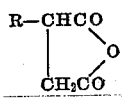

in which R is a large substantially aliphatic hydrocarbon radical having from about 50 to 200 carbon atoms with at least about one-half an equivalent amount of a polyethylene polyamine and heating the resultant mixture to effect acylation and remove the water formed thereby. Suitable amine are diethylene triamine, triethylene tetramine and tetraethylene pentamine. The reaction involves amidation of a dicarboxylic acid or anhydride thereof with a polymer to produce an acyclic diamine, a cyclic diamide, a polymeric amide or a combination of these types of products. It will be noted that the amide groups may further react to form imide groups in the process.

At least one-half of a chemical equivalent amount of the polyethylene polyamine per equivalent of substituted succinic anhydride or acid must be used in the process to produce a satisfactory product with respect to dispersant properties. Generally, it is preferred to use the reactants in equivalent amounts. Equivalency of the polyethylene polyamine reactant is on the nitrogen content, i.e., one having four nitrogens per molecule has four equivalents per mole. This reaction involves the splitting out of water and its removal as it is formed. The reaction product is effective in amounts ranging from about 0.5 to 5.0 weight percent. Methods for preparing the polyethylene polyamine reaction products are well known and have been described in U.S. Pat. No. 3,131,150 and 3,172,892.

An amine antioxidant is important in this fully formulated transmission fluid. Effective antioxidants are the aryl-substituted amine antioxidants exemplified by the Phenyl naphthyl amines, phenylene diamine, phenothiazine and diphenylamine. A particularly preferred antioxidant is phenyl alpha naphthylamine. The antioxidants are effective in a concentration ranging from about 0.1 to 2.5 weight percent.

The automatic transmission fluid of the invention requires a friction modifier such as a modified carboxylic acid additive as a corrosion inhibitor and friction modifier. More particularly, N-acyl sarcosine compounds represented by the formula:

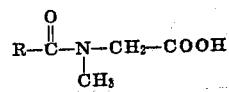

in which R is an aliphatic radical having from 12 to 70 carbon atoms are employed. A particularly effective corrosion inhibitors are those in which R has from 14 to 18 carbon atoms, such as N-oleoyl sarcosine and N-stearoyl sarcosine. This class of materials are employed in concentrations ranging from about 0.05 to 1.0 weight percent.

The antirust and corrosion inhibiting properties of the transmission fluid are supplemented by basic or overbased metal salts of carboxylic and/or sulfonic acids. Highly basic calcium and barium sulfonates are particularly suitable for this purpose. In general, the basic salts of an acid having from 12 to about 24 aliphatic carbon atoms from the class of sulfonic and carboxylic acids, the salt having a mole ratio of at least about 4.5, and preferably from 8 to 20 are especially effective for transmission fluids. These basic salts are prepared by well-known methods which involve mixing a suitable acid with a sufficient proportion of the base to form the salt and to provide an excess of the base falling within the ranges specified. The resultant overbased calcium compounds are employed in the transmission fluid in amounts ranging from about 1 to about 5 percent and the overbased barium sulfonates are employed in amounts ranging from 0.05 to 2.0 weight percent. The methods for preparing the basic metal sulfonates are described in U.S. Pat. No. 2,839,470 and 3,242,079.

An alternate supplementary antirust and corrosion inhibiting additive comprises a mixture consisting of about 91 percent of a hydrolyzed $C_{6\text{-}18}$ alkenyl succinic anhydride, 7.5 percent of a mixture of mono and di-$C_{12}$ alkyl phosphoric acid esters and 1.5 percent of phenol. This additive combination can be employed in the transmission fluid in a concentration ranging from about 0.02 to 0.25 percent.

Antifoam agents are conventionally employed in hydraulic fluids because the fluids are rapidly circulated in operation and air can be entrapped. For this purpose, a silicone fluid of high viscosity, such as a dimethyl silicone polymer having a kinematic viscosity of 25° C. of about 1,000 centistokes and above is preferably employed. A very satisfactory antifoam agent for this purpose is prepared by diluting 10 grams of a dimethyl silicone polymer (1,000 centistokes at 25° C.) with kerosene to provide a solution of 100 cubic centimeters. From 0.005 to 0.025 percent by weight of this concentrate is generally employed in the hydraulic fluid to provide from 50 to 200 parts per million of the silicone polymer based on the hydraulic fluid composition.

The following examples illustrate the automatic transmission fluid of the invention in comparison to similar fluids.

EXAMPLE I

The base oil employed in the fluids below comprised 65 percent of a furfural-refined, acid-treated, clay-contacted, solvent-dewaxed, paraffin base distillate having an SUS at 100° F. of 100; a viscosity index about 100, a flash above 385° F. and a pour below +10° F., 22 percent of an acid-treated naphthenic base distillate having an SUS at 100° F. of 60, a flash above 300° F. and a pour below −40° F. and 13 percent of a paraffin base residuum which has been propane deasphalted, solvent dewaxed and clay contacted and which had an SUS viscosity at 210° F. of 160, a flash of about 540° F. and a pour below 5° F. This base oil mixture had a flash above 375° F., a pour below 0° F. and a viscosity index of about 93.

The friction stable life of transmission fluids was determined in the Powerglide High Energy, Transmission Cycling, Friction Retention and Durability Test hereafter referred to as the AT-13 Test. This test, with only minor variations, is described in The General Motors Dexron Automatic Transmission Fluid Specification issued Apr. 1967. This test is conducted using Chevrolet engine with its corresponding Powerglide transmission mounted on a test stand in such a manner that the power output is adsorbed by a Dynamatic 1519 eddy current dynamometer and an auxiliary inertia wheel increasing total system inertia to 17.54 lb.-ft./sec.² This system gives acceleration rates approximating vehicle level road values.

The fluid under test is used to fill the Powerglide transmission and it is tested by running the engine and transmission in a continuous series of 90-second cycles each consisting of four phases as follows: acceleration for 13.8 seconds open throttle power with upshift occurring at approximately 12-13 seconds after start, deceleration for 8.3 seconds power off (closed throttle) coast down in the top gear (no downshift), acceleration for 9.0 seconds power on (immediate forced kickdown to low), followed by an upshift approximately 9 seconds after start, and deceleration for 58.3 seconds power off. This test is conducted until shift failure (excessive clutch slippage, upshift time over 0.90 seconds or abnormal shift).

The composition of the fluids and the results of the tests on transmission fluid A through E are set forth in Table I below:

TABLE I

| Transmission fluid ⁵ comp., wt. percent | A | B | C | D | E |
|---|---|---|---|---|---|
| Base oil | 92.57 | 91.91 | 92.48 | 91.85 | 89.61 |
| Methacrylate copolymer ¹ | 4.00 | 4.00 | 4.00 | 4.00 | 4.00 |
| Tetraethylene pentamine alkenyl succinic anhydride reaction product ² | 2.50 | 2.50 | 2.50 | 2.50 | 2.00 |
| Zinc dialkyl dithiophosphate | ³ 0.28 | | ⁹ 0.37 | ¹⁰ 1.00 | |
| Zinc di(nonylphenoxyethyl) dithiophosphate ⁴ | | 0.94 | | | 0.94 |
| Phenyl alpha naphthylamine | 0.40 | 0.40 | 0.40 | 0.40 | 0.50 |
| N-stearoyl sarcosine | ⁶ 0.20 | 0.20 | 0.20 | 0.20 | 0.20 |
| Anti-rust concentrate | (⁷) | (⁷) | (⁷) | (⁷) | ⁸ 2.75 |
| Powerglide AT-13 cycling test: Duration, hours to 0.9 sec. shift time | 81 | 250 | 95 | 109 | 435 |

1. Approx. 35 wgt. percent oil solution of copolymers of butyl, lauryl, stearyl and dimethyl aminoethyl methacrylates in approximately 21:53:22:4 weight ratio.
2. Approx. 50 wgt. percent oil solution of the reaction product of alkenyl succinic anhydride in which the alkenyl radical is from polybutene of about 1,100 molecular weight and tetraethylene pentamine in an amine to anhydride mole ratio ranging from 0.7-1.0.
3. Zinc salt from the reaction of mixed alcohols (methylisobutyl carbinol and isopropanol) with $P_2S_5$ in 2.7:2.3:1.0 mole ratio and then reaction with zinc oxide.
4. Zinc salt from the reaction of nonylphenol-ethylene oxide and $P_2S_5$ followed by reaction with zinc carbonate. Employed in a 68 percent by wgt. oil solution.
5. All fluid contained 150 p.p.m. of dimethyl silicone solution
6. N-oleoyl sarcosine
7. 0.05 percent of an antirust concentrate consisting of 91 percent of tetrapropenyl succinic anhydride, 7.5 percent of mono- and di-$C_{12}$ alkyl phosphoric acid esters and 1.5 percent phenol.
8. 2.75 percent basic salts; 2.50 percent overbased calcium sulfonate 300 TBN and 0.25 percent basic barium sulfonate 9. Zinc di(2,2,4-trimethyl pentyl) dithiophosphate.
10. Zinc di(n-dodecyl) dithiophosphate.

In the foregoing Table I, runs B and E exemplify the present invention wherein a zinc salt of di($C_{6\ 15}$ alkylphenoxypolyalkoxyalkyl) dithiophosphate when employed in a critically balanced automatic transmission fluid formulation results in a highly effective fluid which passed the Powerglide AT-13 Cycling Test. Compositions containing related zinc salts as exemplified by Runs A, C and D were totally ineffective by wide margins in the Powerglide AT-13 Cycling Test which shows the critical nature of this particular component. Run E is an outstanding fluid of the invention with a life of 435 hours in the severe Cycling Test.

Obviously, many modifications and variations of the invention, as herein set forth, may be made without departing from the spirit and scope thereof and, therefore, only such limitations should be imposed as are indicated in the appended claims.

We claim:
1. An automatic transmission fluid comprising at least 86 weight percent of a mineral lubricating oil, 0.1 to 5.0 percent of a zinc di($C_{6\ 15}$ alkyl phenoxypolyalkoxyalkyl) dithiophosphate having the formula:

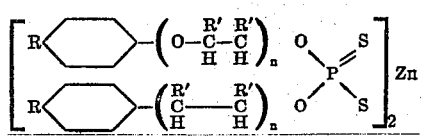

in which R represents an alkyl radical having from six to 15 carbon atoms, R' is hydrogen or an alkyl radical having from one to four carbon atoms and n is an integer from 1 to 10, as a viscosity index improver from 0.5 to 10 percent of a nitrogen-containing polymer of mixed alkyl and aminoalkyl esters of methacrylic acid having a molecular weight ranging from 25,000 to 1,250,000, as a dispersant from 0.5 to 5.0 percent of a reaction product of at least a one-half chemical equivalent amount of a polyethylene polyamine selected from the group consisting of diethylene triamine, triethylene tetramine, and tetraethylene pentamine with a $C_{50\ 200}$ alkenyl succinic anhydride, as an antioxidant from 0.1 to 2.5 percent of an N-aryl substituted naphthylamine and as a friction modifier from 0.05 to 1 percent of an N-acyl sarcosine selected from the group consisting of N-oleoyl sarcosine and N-stearoyl sarcosine.

2. An automatic transmission fluid according to claim 1 in which said zinc di($C_{6\ 15}$ alkylphenoxypolyalkoxyalkyl) dithiophosphate is a zinc di($C_{6\ 15}$ alkylphenoxyethyl) dithiophosphate.

3. An automatic transmission fluid according to claim 1 in which said zinc di($C_{6\ 15}$ alkylphenoxypolyalkoxyalkyl) dithiophosphate is zinc di (nonxylphenoxyethyl) dithiophosphate.

4. An automatic transmission fluid according to claim 1 in which said mineral lubricating oil consists of about 65 percent of a furfural refined, acid-treated, clay-contacted, solvent-dewaxed, paraffin base distillate having an SUS at 100° F. of 100, a viscosity index about 100, a flash above 380° F. and a pour below about +10° F., 22 percent of an acid-treated, naphthenic base distillate having an SUS at 100° F. of 60, a flash above 300° F., and a pour below −40° F. and 13 percent of a paraffin base residuum which has been propane deasphalted, centrifuged dewaxed, and clay contacted and which has an SUS viscosity at 210° F. of about 160, a flash above 530° F. and a pour of +5° F.

5. An automatic transmission fluid according to claim 1 additionally containing as an antirust additive from about 1 to 5 percent of an overbased calcium sulfonate or carboxylate and from about 0.05 to 0.08 percent of an overbased barium sulfonate.

6. An automatic transmission fluid according to claim 1 containing from about 0.02 to 0.25 percent of an additive combination comprising about 91 percent of a hydrolyzed C$_{6-18}$ alkenyl succinic acid anhydride, 7.5 percent of a mixture of mono- and di-C$_{12}$ alkyl phosphoric acid esters and 1.5 percent of phenol.

7. An automatic transmission fluid according to claim 1 in which said mineral lubricating oil comprises 65 percent of a furfural-refined, acid-treated, clay-contacted, solvent-dewaxed paraffin based distillate having an SUS at 100° F. of 100, a viscosity index about 100, a flash above 380° F. and a pour below about +10° F., 22 percent of an acid-treated, naphthenic base distillate having an SUS at 100° F. of 60, a flash above 300° F. and a pour below −40° F. and 13 percent of a paraffin base residuum which has been propane deasphalted, centrifuged dewaxed and clay contacted and which has an SUS viscosity at 210° F. of about 160, a flash above 530° F. and a pour of +5° F., 0.1 to 5.0 percent of a zinc di (nonylphenoxyethyl) dithiophosphate, 0.5 to 10 percent of nitrogen-containing polymer of mixed alkyl and amino alkyl esters of methacrylic acid having a molecular weight in the range of 35,000 to 200,000, 0.5 to 5 percent of a reaction product of a tetraethylene pentamine and an alkenyl succinic anhydride, 0.1 to 2.5 percent of phenyl alpha naphthylamine and 0.5 to 1 percent of N-stearoyl sarcosine.

* * * * *